United States Patent [19]

Haug et al.

[11] 4,252,151

[45] Feb. 24, 1981

[54] PRESSURE VESSEL

[75] Inventors: Gerhard Haug, Sachsenheim; August Kraisel, Waiblingen; Heinz Siegel, Stuttgart, all of Fed. Rep. of Germany

[73] Assignee: Robert Bosch GmbH, Stuttgart, Fed. Rep. of Germany

[21] Appl. No.: 936,476

[22] Filed: Aug. 24, 1978

[30] Foreign Application Priority Data

Dec. 1, 1977 [DE] Fed. Rep. of Germany ... 7736711[U]

[51] Int. Cl.[3] ................................ F16L 55/00

[52] U.S. Cl. ................................ 138/30; 138/44

[58] Field of Search ...................... 138/30, 26, 40, 44; 220/85 B

[56] References Cited

U.S. PATENT DOCUMENTS

| | | | |
|---|---|---|---|
| 1,423,750 | 7/1922 | Brombacher | 138/40 X |
| 1,706,070 | 3/1929 | Methudy | 138/40 X |
| 1,739,360 | 12/1929 | Hopkins | 138/40 X |
| 1,889,792 | 12/1932 | Rosenburgh | 138/40 X |
| 2,877,801 | 3/1959 | Mercier | 138/30 |
| 2,880,759 | 4/1959 | Wisman | 138/30 |
| 3,139,114 | 6/1964 | Benzel | 138/45 |
| 3,494,878 | 2/1970 | Greer | 138/30 |
| 3,572,389 | 3/1971 | Wielond | 138/30 |
| 3,593,744 | 7/1971 | Smith | 138/30 X |
| 3,868,972 | 3/1975 | Zirps | 138/30 |

FOREIGN PATENT DOCUMENTS

| | | | |
|---|---|---|---|
| 1487445 | 7/1967 | France | 138/30 |

*Primary Examiner*—James E. Bryant, III

*Attorney, Agent, or Firm*—Michael J. Striker

[57] ABSTRACT

A pressure vessel includes a housing having an interior and a passage communicating with the interior and being bounded by an inner circumferential surface. A separate plug is received in the passage. The plug has an outer circumferential surface juxtaposed with the inner circumferential surface. These surfaces define together at least one gap of relatively small cross-section. The gap extends lengthwise of the passage communicating with the interior of the housing.

5 Claims, 5 Drawing Figures

PRESSURE VESSEL

BACKGROUND OF THE INVENTION

This invention relates to pressure vessels.

More particularly, the invention concerns pressure vessels which can be used, for example, to keep a constant fluid pressure on the piston of a hydraulic cylinder.

It is known in the art to provide a pressure vessel with a passage having a valve therein which is operative to control fluid-flow through the passage. Usually, such a vessel is provided with an expandable elastic partition which subdivides the interior of the vessel into a gas-containing compartment and a liquid-containing compartment. An additional purpose of the valve is to prevent penetration of portions of the separating partition into the passage when the partition expands towards the passage during discharging of liquid from the vessel through the passage. It has been recognized that such pressure vessels are rather expensive to construct.

It is also known in the art to provide a pressure vessel with a separate liquid-discharging nipple which is connected, i.e., welded, to the vessel. Such a nipple is provided with a plurality of throughgoing passages of a small diameter. Thus, when the elastic partition expands, it cannot enter into the passage of the nipple. However, such a construction is also found to be relatively expensive.

SUMMARY OF THE INVENTION

It is a general object of the present invention to overcome the above-discussed disadvantages of the prior art.

More particularly, it is an object of the invention to provide an improved pressure vessel which is less expensive than the prior art pressure vessels.

A further object is to provide an improved pressure vessel which is integrally connected with a liquid-discharging nipple.

Pursuant to these objects, and others which will become apparent hereafter, one feature of the invention resides in providing a housing having an interior and a passage communicating with said interior and being bounded by an inner circumferential surface. A separate plug is received in the passage and has an outer circumferential surface juxtaposed with the inner circumferential surface of the passage. The two surfaces define therebetween at least one gap of relatively small cross-section. The gap extends lengthwise of the passage in communication with the interior and with the exterior of the housing.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
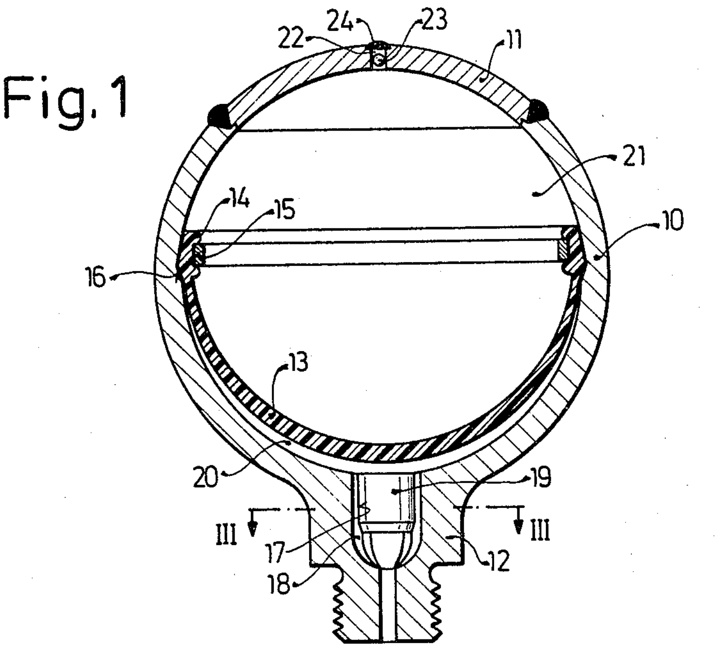
FIG. 1 is a sectional view of a pressure vessel embodying the present invention.
Figure 2:
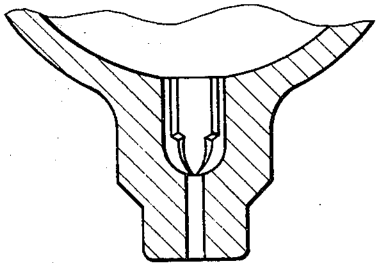
FIG. 2 shows, on an enlarged scale, a fragmentary section of the pressure vessel.
Figure 3:
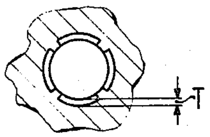
FIG. 3 is a sectional view taken along the line III—III in FIG. 1.

Referring now to the drawings and first of all to FIGS. 1-3 thereof, it may be seen that the reference numeral 10 designates a lower portion of the pressure vessel. The vessel has an upper portion 11 which is fixedly mounted, for example, welded, on the lower portion 10. Both portions 10 and 11 form together a ball-shaped hollow housing. The lower portion 10 is provided with a nipple 12, which is integrally connected to the portion 10. The lower portion 10 is manufactured by the flow-molding process (e.g. sheet-metal is pressed under pressure into a mold to flow to the required shape) to simultaneously form the lower portion 10 and the nipple 12 thereon. An elastic separating partition (diaphragm) is received within the interior of the lower portion 10. The partition is provided with a bead 14 received in a ring 15 which connects the partition 13 to the inside wall of the lower portion 10. In order to obtain a stably fixed position of the partition 13 the inside wall of the lower portion 10 is provided with a shoulder 16 for supporting the partition 13 urged against the shoulder 16 by the ring 15. The separating partition 13 divides the interior of the housing into a liquid containing compartment 20 and a gas containing compartment 21.

The nipple 12 is provided with a throughgoing longitudinal passage 17, whose bounding wall surface in its turn is provided with at least one longitudinal groove 18. The groove 18 or grooves (for example 4 grooves, see FIG. 3) are formed during the molding process of forming the lower portion 10.

The grooves 18 have a relatively small radial depth T. A plug 19 of e.g. a sintered material is pressed into the passage 18, so as to completely fill the latter. Thus, the liquid can flow from the liquid-containing compartment 21 of the tank 1 only through the grooves 18.

Such a construction renders it impossible for the separating partition 13 to enter into the passage 17 or the groove or grooves 18 of the nipple 12 even when the liquid-containing compartment 20 is entirely empty.

When the separating partition 13 is installed in the interior of the lower portion 10 the latter is closed by the upper portion 11 (for example, welded together). The upper portion 12 is provided with a throughgoing bore 22, for introducing gas into the gas-containing compartment 21. A ball 23 is closely installed in the bore 22, which is closed from outside the upper portion by a welded portion 24. In such a condition the vessel is ready for use.

Figure 4:
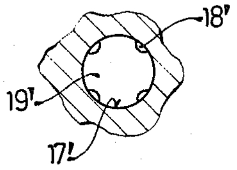
FIG. 4 is a sectional view similar to the one taken along the line III—III in FIG. 1 but showing another embodiment of the present invention.

The liquid-discharging outlet can be composed otherwise than in FIGS. 1-3—see FIG. 4. The longitudinal passage is there designated by a reference numeral 17'. The passage 17' is provided in a nipple 12 having an entirely smooth circumferential wall. However, here the plug 19' is circumferentially provided with a plurality (for example 4) of the longitudinally extending radial grooves 18'.

Figure 5:
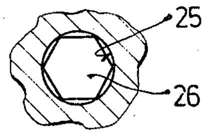
FIG. 5 also is a sectional view similar to the one taken along the line III—III on FIG. 1 but of a third embodiment.

Another embodiment is shown in FIG. 5. In this case, a plug 26 having a multiflange cross-section (for example six-flange rod) is pressed into a smooth passage 25 of e.g. circular cross-section.

It will be understood that each of the elements described above, or two or more together, may also find a useful application in other types of pressure vessels differing from the types described above.

While the invention has been illustrated and described as embodied in a pressure vessel, it is not intended to be limited to the details shown, since various modifications and structural changes may be made without departing in any way from the spirit of the present invention Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A pressure vessel, comprising: a housing having an interior and a passage communicating with said interior, the passage being bounded by an inner circumferential surface; an elastic partition subdividing the interior of said housing into a first compartment for containing liquid and a second compartment for containing gas, the passage communicating with the first compartment and allowing liquid to flow into and out of said first compartment; and a separate and unitary plug received in said passage and having an outer circumferential surface which is juxtaposed with said inner circumferential surface bounding said passage and defines with said inner circumferential surface at least one gap having a relatively small cross-section and extending lengthwise of said passage in communication with said interior and with the exterior of the housing.

2. The vessel defined in claim 1, wherein the plug is made of a sintered material.

3. A vessel as defined in claim 1, wherein said inner circumferential surface of said passage is provided with at least one groove extending lengthwise of said passage and in part defining said gap when said plug is inserted in said passage.

4. A vessel as defined in claim 1, wherein said outer circumferential surface of said plug is provided with at least one groove extending lengthwise of said plug and in part defining with said inner circumferential surface said gap when said plug is inserted in said passage.

5. A vessel as defined in claim 4, wherein said plug is pressed into said passage.

* * * * *